Jan. 9, 1934.  G. D. SHAVER  1,942,733
FLEXIBLE SHEET INSULATION AND METHOD OF PRODUCING THE SAME
Original Filed Oct. 20, 1931
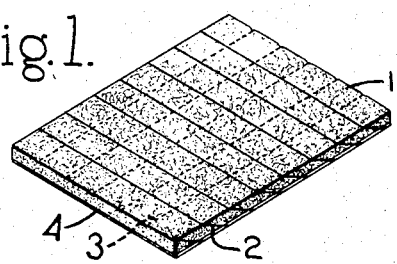
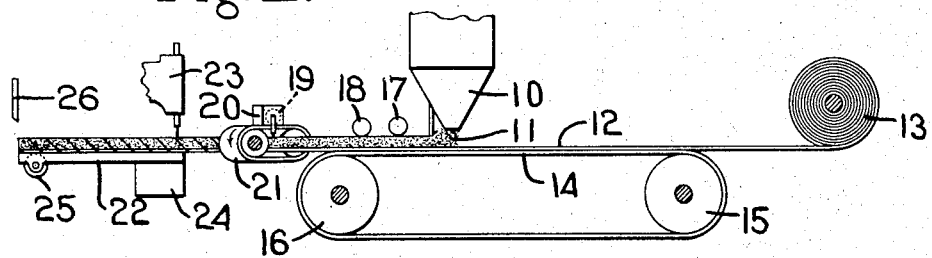
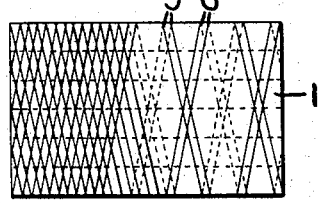
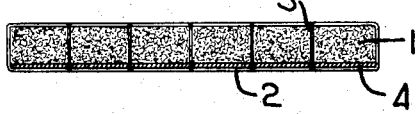
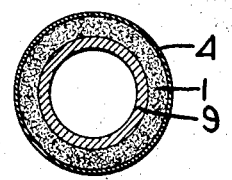
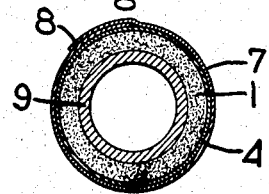
Inventor.
George D. Shaver
by Heard Smith & Tennant.
Attys.

Patented Jan. 9, 1934

1,942,733

UNITED STATES PATENT OFFICE 1,942,733

FLEXIBLE SHEET INSULATION AND METHOD OF PRODUCING THE SAME

George D. Shaver, Kalamazoo, Mich., assignor to The Therminsul Corporation of America, Boston, Mass., a corporation of Massachusetts Application October 20, 1931, Serial No. 569,910
Renewed August 12, 1933

9 Claims. (Cl. 154—28)

This invention relates to improvements in flexible sheets of finely cellular fibrous insulation, and the method of producing the same, and the principal object of the invention is to provide an insulation sheet comprising a finely cellular sheet of fibrous insulating material having a series of flexible binding strands extending across opposite faces of the sheet and around the edges thereof and anchored in place by lines of stitching in which the stitches extend through the material, with the cords of such stitches overlying and anchoring the strands to the material.

More specifically, the invention relates to a flexible insulation sheet comprising a finely cellular sheet of fibrous insulating material having a binder wound transversely across the upper and under faces of the sheet and around the edges thereof at spaced intervals, with parallel lines of stitches passing through the sheet and extending longitudinally thereof, thereby anchoring the binder to the sheet at the points of intersection.

A further object of the invention is to provide a flexible sheet of insulation of the character above specified in which the insulating material is composed of pure rock wool.

Another object of the invention is to provide a flexible insulation sheet comprising a finely cellular sheet of fibrous insulating material, but preferably rock wool, provided with a relatively thin backing sheet of tough fibrous material, binder cords wound transversely across the upper and lower faces of the superimposed sheets and extending around the edges thereof, with lines of stitches passing through the superimposed sheets, and preferably lying in parallelism intersecting the binder cords and anchoring the same to the sheets at the points of intersection.

A further object of the invention is to provide a method of making a flexible insulation sheet of the character specified which comprises continuously producing a finely cellular travelling sheet of fibrous insulating material, preferably pure rock wool, continuously winding a flexible binder around the travelling sheet as it is produced, thereby causing the strands extending transversely across the upper and lower faces of the sheet to lie in substantial parallelism and sewing the travelling sheet through and through with a plurality of lines of stitches extending longitudinally of the sheet.

These and other objects and features of the invention will more fully appear from the following description and the accompanying drawing and will be particularly pointed out in the claims.

In the drawing:

Fig. 1 is a perspective view of a flexible insulation sheet embodying the present invention;

Fig. 2 is a diagrammatic view of suitable mechanism for continuously producing a sheet of insulation of the character above described having a backing of relatively tough fibrous material;

Fig. 3 is a plan view of a sheet of insulation of the character above specified having a plurality of sets of binder cords wound in opposite directions across the upper and lower faces of the sheet and around the edges thereof at an angle to the longitudinal axis of the sheet, with parallel lines of stitching extending longitudinally of the sheet, certain of the transverse windings being omitted for the purpose of clearness;

Fig. 4 is a vertical sectional view of a flexible sheet of insulating material of the character above specified having a backing of relatively thin tough fibrous material;

Fig. 5 is a side elevation of a sheet of the character described having secured to the backing a covering sheet extending beyond the end of the sheet and adapted to overlap the contiguous edges of the sheet when the sheet is rolled into cylindrical form;

Fig. 6 is a vertical sectional view of a pipe wrapped with an insulation sheet having a backing, but no cover, of the character above described; and, Fig. 7 is a similar view illustrating a pipe wrapped with the insulation sheet having a backing of the character illustrated in Fig. 5.

The insulation sheet illustrated in Fig. 1 comprises a flat body 1 of fibrous insulating material, preferably pure rock wool, with a binder cord 2 wrapped continuously transversely across the upper and lower faces of the sheet and around the edges thereof, with lines of stitching 3 extending longitudinally of the sheet and securing the binder 2 to the body of the sheet at the points of intersection of the stitches and binder. The sheet desirably is provided with a backing 4 of fibrous material, such as paper, cloth, or felt, and desirably the binder extends across the face of the sheet of insulating material, thence around the edges of both the insulating material and the backing, and across the exposed face of the backing, the stitches extending through both the insulating material and the backing, thereby anchoring the binder and also the backing to the sheet of insulating material.

The binder illustrated in Fig. 1 is a single cord wound transversely of the sheet in parallel strands extending substantially at right angles to the longitudinal axis of the sheet and the lines of stitching which pass through and through the sheet and its backing extend in parallelism to the longitudinal axis of the sheet at spaced intervals substantially equal to the space between the parallel binding strands.

Fig. 4, which is a transverse sectional view of the sheet illustrated in Fig. 1, shows the manner in which the binder extends transversely around the sheet and is anchored thereto by the longitudinal lines of stitching.

Fig. 3 illustrates a sheet 1 of insulating material in which a plurality or series of binder cords 5 and 6 are wound in opposite directions across the upper and lower faces of the sheet 1 and around the edges thereof, with longitudinal parallel lines of stitching extending through and through the sheet and anchoring the binding strands to the sheet at the point of intersection of the lines of stitches with the binder strands.

Fig. 5 illustrates the construction shown in either Figs. 1 and 3 with a covering sheet 7 secured to the backing 2 preferably by glue, or other suitable adhesive, and having an extension 8 projecting beyond one of the ends of the sheet. When such a sheet is employed for pipe covering it is wound about the pipe 9, as illustrated in Fig. 7, and the extension 8 overlapped and glued, or otherwise secured, to the cover in such a manner as to fixedly secure the insulation upon the pipe.

*The method of producing the insulation sheet*

An insulation sheet of the character above described may be produced by hand or by suitable machinery. If produced by hand the fibrous material is spread from a suitable support into a sheet of substantially uniform thickness and consistency to provide a finely cellular sheet of insulation. A binder cord, or a plurality of binder cords, are then wound around the sheet by passing the same across the upper face of the sheet around the edge thereof, thence across the lower face of the sheet, and around the edge thereof, so that the strands upon the upper and lower faces of the sheet lie in substantial parallelism. The sheet is then stitched through and through by lines of stitching extending longitudinally of the sheet. Such lines of stitching may be produced by hand or by a sewing machine and preferably extend in parallelism to the longitudinal axis of the sheet. The threads of the lines of stitching, which lie upon the upper and lower surfaces of the sheet, or of the backing, if a backing is employed, serve to anchor the binder cords firmly to the sheet at the point of intersection of the lines of stitching therewith.

Suitable mechanism for producing such a sheet commercially is illustrated in Fig. 2 which comprises suitable means, such as a feeder 10 for delivering a continuous sheet 11 of rock wool, or other suitable fibrous material, upon a backing layer 12 which desirably is drawn from a spool 13 along the upper lead 14 of an endless belt mounted upon rolls 15 and 16 which are driven in any suitable manner. Desirably pressing and smoothing rolls 17 and 18 are provided to compress the sheet to the desired thickness and to insure its uniformity. Such rolls desirably are driven at a speed somewhat in excess of the surface speed of the sheet which is formed upon the backing and slightly condense the surface of the sheet which is engaged by the rolls. A spool 19 of binder cord is carried in a suitable support 20 which is mounted upon an endless belt 21 carried by rollers located upon opposite sides of the sheet of insulating material and driven in any suitable manner (not shown) so that the spool will travel across the upper face of the sheet around the edges thereof and beneath the backing.

The sheet, which is thus continuously formed and bound, is carried across the bed plate 22 of a suitable gang sewing machine provided with a plurality of heads 23, one of which is shown, and having a container 24 for the complementary stitch forming mechanism, so that a plurality of lines of stitches are simultaneously formed longitudinally of the sheet as it passes across the bed plate 22 of the sewing machine.

The bed plate may be provided with one or more anti-friction rolls 25 for supporting the sheet and if desired a suitable cutter 26 may be provided and actuated at suitable intervals to sever the sheet thus continuously produced into desirable uniform lengths.

The endless belt, carrying the spool of binder, may be arranged at right angles to the longitudinal axis of the travelling sheet, and the sheet fed intermittently to lay the binder strands in parallelism across the respective upper and lower faces of the sheet, as illustrated in Fig. 1, or the sheet may be advanced continuously to lay the binder strands transversely of the respective upper and lower faces of the sheet in parallelism at an angle to the longitudinal axis of the sheet.

If the travelling belt, which carries the spool of binder cord, is disposed at a proper angle to the longitudinal direction of movement of the web, and the speed at which the endless belt 21 is driven is properly co-ordinated to the speed at which the continuous sheet travels, the binding cords may be laid across the respective upper and lower faces of the sheet in parallelism and at right angles to the longitudinal axis of the sheet, as illustrated in Fig. 1.

If the endless belt, which carries the binder, is provided with a plurality of spools of binder cord, or if a plurality of belts, carrying binder spools, are employed, a series of parallel binder cords may be wound in parallelism across the respective upper and lower faces of the sheet at uniformly spaced intervals. If a plurality of endless belts, carrying binder cords, are employed, and alternate belts driven in opposite directions, the respective binder cords delivered by such belts will be laid in parallelism across the travelling sheet at reversely arranged angles to the axis of the sheet, thereby producing a diamond-shaped arrangement of binder cords, as illustrated in Fig. 3. All of such binder cords will be anchored to the sheet by the lines of stitching at the points of intersection of the lines of stitching with the respective strands of binder cords.

By reason of the present invention, therefore, a sheet of insulating material, either with or without a backing, may be made either manually or by suitable mechanism. The strands of binder cord upon the upper and lower faces of the sheet, and if desired its backing also, may be spaced at such intervals as will insure permanent binding of the sheet, and prevent the otherwise loose rock wool, or other fibrous material, from becoming loosened from the body of the sheet.

The winding of the binder around the edges of the sheet in particular prevents the fraying of the sheet, or the carrying away of the material at the edge portion of the sheet which commonly occurs in sheets of insulating material which have hitherto been produced. Furthermore, sheets of insulating material, particularly where pure rock wool, or other fibrous material are employed to produce a finely cellular sheet, are so re-enforced by the binding cords and the anchoring stitches that the sheets are self-supporting and can be roughly handled without detriment to the sheet.

It, therefore, follows that sheets of insulating material made in accordance with my invention are far superior to those which have hitherto been produced, particularly where the sheets are constructed for use as refrigerator linings, for pipe coverings, for boiler and tank insulation, for wall insulation, and numerous other uses to which insulating material of this character is applied.

Having thus described the invention, what is claimed as new, and desired to be secured by Letters Patent, is:

1. A flexible insulation sheet comprising a finely cellular sheet of fibrous insulating material having a binder wound transversely across the upper and under faces of said sheet and around the edges thereof at spaced intervals and having parallel lines of stitches passing through said sheet and extending longitudinally thereof, anchoring the binder to the sheet at the points of intersection.

2. A flexible insulation sheet comprising a finely cellular sheet of fibrous insulating material having a plurality of binder cords continuously wound in opposite directions and in angular relation to the longitudinal axis of the sheet across the upper and lower faces of said sheet and around the edges thereof, and having a plurality of parallel lines of stitches passing through said sheet and extending transversely of said binder cords, and anchoring said cords to said sheet at the points of intersection.

3. A flexible insulation sheet comprising a finely cellular sheet of fibrous insulating material provided with a relatively thin backing sheet of tough fibrous material, with binder cords wound transversely across the upper and lower faces of said superimposed sheets and extending around the edges thereof, with the strands of said binder upon the upper and lower faces lying in parallelism and at an angle to the longitudinal axis of said sheet, and a series of parallel lines of stitches passing through said superimposed sheets and extending longitudinally of said sheets, and anchoring said binder cords to said sheets at the points of intersection.

4. A flexible insulation sheet comprising a finely cellular sheet of fibrous insulating material provided with a relatively thin backing sheet of tough fibrous material and having a series of binder cords wound in parallelism transversely across the upper and lower faces of said superimposed sheets and extending around the edges thereof with the strands of said binder upon the upper and lower faces lying in parallelism and at an angle to the longitudinal axis of the sheet, and another series of binder cords wound in the opposite direction transversely across the upper and lower faces of said superimposed sheets and extending around the edges thereof, with the strands of said binder cords upon the upper and lower faces lying in parallelism and at an angle to the longitudinal axis of the sheet, and a series of parallel lines of stitches passing through said superimposed sheets and extending longitudinally of said sheets and anchoring said binder cords to said sheets at the points of intersection.

5. A flexible insulation sheet comprising a finely cellular sheet of pure rock wool having a fibrous binder cord wound transversely across the upper and under faces of the sheet and around the edges thereof at spaced intervals with the strands of said binder upon the upper and lower faces lying in substantial parallelism, and a series of parallel lines of stitches passing through said sheet and extending longitudinally thereof and anchoring said binder cords to said sheets at the points of intersection.

6. The method of making a flexible insulation sheet which comprises continuously producing a finely cellular travelling sheet of fibrous insulating material, continuously winding a flexible binder around said travelling sheet as it is produced thereby causing the strands extending transversely across the upper and lower faces of the sheet to lie in parallelism, and sewing the travelling sheet through and through with a plurality of lines of parallel stitches extending longitudinally thereof.

7. The method of making a flexible insulation sheet which comprises continuously assembling upon a travelling backing sheet of tough fibrous material, a cellular sheet of fibrous insulating material of uniform thickness, continuously winding transversely about said travelling sheets a binder cord of flexible fibrous material and stitching the travelling sheet longitudinally with a plurality of lines of stitches extending longitudinally of the sheets, thereby anchoring the binder cords to the sheet and backing at the points of intersection.

8. The method of making a flexible insulation sheet which comprises continuously producing a finely cellular travelling sheet of fibrous insulating material, continuously winding a plurality of flexible binder cords around the travelling sheet as it is produced, thereby causing the strands extending transversely across the upper and lower faces of the sheet to lie in parallelism at an angle to the longitudinal axis of the travelling sheet, and sewing the travelling sheet through and through with a plurality of parallel lines of stitches extending longitudinally thereof.

9. The method of making a flexible insulation sheet which comprises continuously producing a finely cellular travelling sheet of fibrous insulating material, continuously winding binder cords in opposite directions across the upper and lower faces of the sheet and around the edges thereof and stitching the travelling sheet longitudinally with a plurality of lines of stitching, intersecting the binder cords and anchoring the same to the sheet.

GEORGE D. SHAVER.